United States Patent [19]

Gooch

[11] Patent Number: 5,396,540

[45] Date of Patent: Mar. 7, 1995

[54] REMOTE VEHICLE COMMUNICATIONS SYSTEM AND METHOD

[75] Inventor: Guy M. Gooch, Alburnett, Iowa

[73] Assignee: Rockwell International Corporation, Seal Beach, Calif.

[21] Appl. No.: 231,862

[22] Filed: Apr. 22, 1994

Related U.S. Application Data

[63] Continuation of Ser. No. 919,002, Jul. 23, 1992, abandoned.

[51] Int. Cl.$^6$ ........................ H04M 11/00; G01S 5/02
[52] U.S. Cl. ...................................... 379/59; 342/357
[58] Field of Search ............... 340/988, 989, 991, 993; 342/352, 357, 388, 389, 450, 451, 453, 454, 457, 386; 379/58, 59, 60; 455/12.1, 13.1, 33.1, 33.2, 166.2

[56] References Cited

U.S. PATENT DOCUMENTS

| | | | |
|---|---|---|---|
| 4,700,374 | 10/1987 | Bini | 379/60 |
| 5,032,845 | 7/1991 | Velasco | 342/389 |
| 5,043,736 | 8/1991 | Darnell et al. | 342/357 |
| 5,068,656 | 11/1991 | Sutherland | 340/991 |
| 5,125,103 | 6/1992 | Grube et al. | 455/166.2 |
| 5,235,633 | 8/1993 | Dennison et al. | 379/60 |

*Primary Examiner*—Curtis Kuntz
*Assistant Examiner*—Michael B. Chernoff

*Attorney, Agent, or Firm*—M. Lee Murrah; George A. Montanye; H. Fredrick Hamann

[57] ABSTRACT

A telephone call may be made to a remote vehicle, such as a long haul truck, located in an unknown cellular telephone cell in a remote service area. The remote vehicle is provided with a cellular telephone, satellite data communications system and a position signal receiver for a system such as LORAN-C or Global Positioning System (GPS). If the control center desires to initiate a voice communication with the remote vehicle, the control facility transmits a voice communication request to the remote vehicle via a non-voice data communications satellite. The position signal receiver receives data from the LORAN-C or GPS transmitter indicative of the current geographic location of the remote vehicle and transmits the data to the control center via the data communications satellite. At the control center a computer with a data base identifying the geographic extent of relevant cellular telephone cells uses the location of the remote vehicle to identify the cell in which the remote vehicle is presently located. A telephone call is then initiated from the control center to the remote vehicle via landline and cellular telephone network serving the identified cell. Further, if the operator of the remote vehicle desires to initiate a telephone call, he can send a request via the satellite data link. The control center can then initiate the call as described above.

4 Claims, 4 Drawing Sheets

REMOTE VEHICLE COMMUNICATIONS SYSTEM AND METHOD

This Application is a File Wrapper continuation of application Ser. No. 07/919,002, filed Jul. 23, 1992, now abandoned.

BACKGROUND OF THE INVENTION

The invention relates to communications, and more particularly to communications with remote vehicles from a central location, and most particularly to communications with remote vehicles using earth satellites and cellular telephone systems.

Voice communications with remote vehicles, such as long haul trucks, from a control center is both inconvenient and inefficient. Presently, truckers must stop at a facility with a landline telephone to call their control, or dispatching, center to relay location information, to receive revised instructions, or the like. Finding such a facility that can accommodate a large, unwieldy vehicle is problematical, and the down time associated with stops wastes valuable time.

Non-voice data transmission by means of a satellite link is currently becoming available. In this system a central control facility is linked by landline telephone to a satellite link facility having a radio transmitter/receiver and an antenna, and the truck cab is provided with a computerized data terminal connected to a radio transmitter/receiver and a satellite antenna. Messages are sent from the central control facility to the satellite link where they are sent by the radio transmitter to the satellite. The satellite retransmits the messages to the truck where they are received by the antenna and radio receiver and displayed on the data terminal. Messages from the truck are transmitted to the central control facility by the same system.

Voice communications are now commonly available by cellular telephone. In this system local telephone landlines are connected with mobile telephones by means of a multiplicity of transmitters and receivers each covering an area known as a "cell". As a vehicle with a mobile telephone moves from location to location, the connection is automatically switched to the cell best covering the current vehicle location. The group of contiguous cells under control of a common operator and operating under a single FCC license are referred to as "service areas". Normally calls from cell to cell within a service area are without additional charge. However, calls from service area to service area are subject to additional charges.

Long haul trucks could use standard cellular telephone services, but cellular telephones making calls from outside their "home" service area are subject to a special "roaming" surcharge, which are typically $2 to $3 per day, in addition to "long distance" toll charges. However, calls initiated within the service area are not subject to the surcharge. Unfortunately, in order to make calls from the control center, it is necessary to know the service area in which the vehicle is currently located. Also, in order to control the relatively high cost of roaming charges, it is desirable that only the dispatcher be able to initiate a phone call between the control center and the remote vehicle.

It is therefore an object of the present invention to provide more efficient and economical voice communications between a control center and a remote vehicle.

It is another object of the present invention to provide economical voice communications via a cellular telephone connection between a control center and a remote vehicle.

It is a further object of the present invention to permit remote vehicles to initiate a cellular telephone communication only with approval of the dispatching center.

It is yet another object of the present invention to combine non-voice satellite communications with voice cellular telephone communications to provide a more efficient and economical communications system.

Still other objects will become apparent in the following summary and description of a preferred embodiment of the invention.

SUMMARY OF THE INVENTION

The present invention permits a central dispatch center to control and approve all cellular telephone connections with a remote vehicle regardless of the service area in which the remote vehicle is located. The objects of the invention are achieved by providing the remote vehicle with a cellular telephone, a satellite data communications system and a position signal receiver. If the control center desires to initiate voice communication with the remote vehicle, the control facility transmits a location request to the remote vehicle via a non-voice data communications satellite system. When the request is received, the position signal receiver in the remote vehicle receives data from a position signal transmitter indicative of the current geographic location of the remote vehicle. The remote vehicle then transmits the data to the control center via the communications satellite. At the control center or any other appropriate data base location a computer with a data base identifying the geographic extent of relevant cellular telephone service areas uses the location of the remote vehicle to identify the service area in which the remote vehicle is presently located. A telephone call is then initiated from the control center to the remote vehicle via landline and cellular telephone network serving the identified service area.

Conversely if the driver desires to initiate the call, the driver sends a request, including the vehicle location, to the control center via the satellite link. If the control center is willing to take the call, the call is placed as described above. Thus all cellular phone connects are initiated from the control center.

BRIEF DESCRIPTION OF THE DRAWING

The invention may be more fully understood by reading the following description of a preferred embodiment of the invention in conjunction with the appended drawings wherein.

DETAILED DESCRIPTION OF A PREFERRED EMBODIMENT

Figure 1:
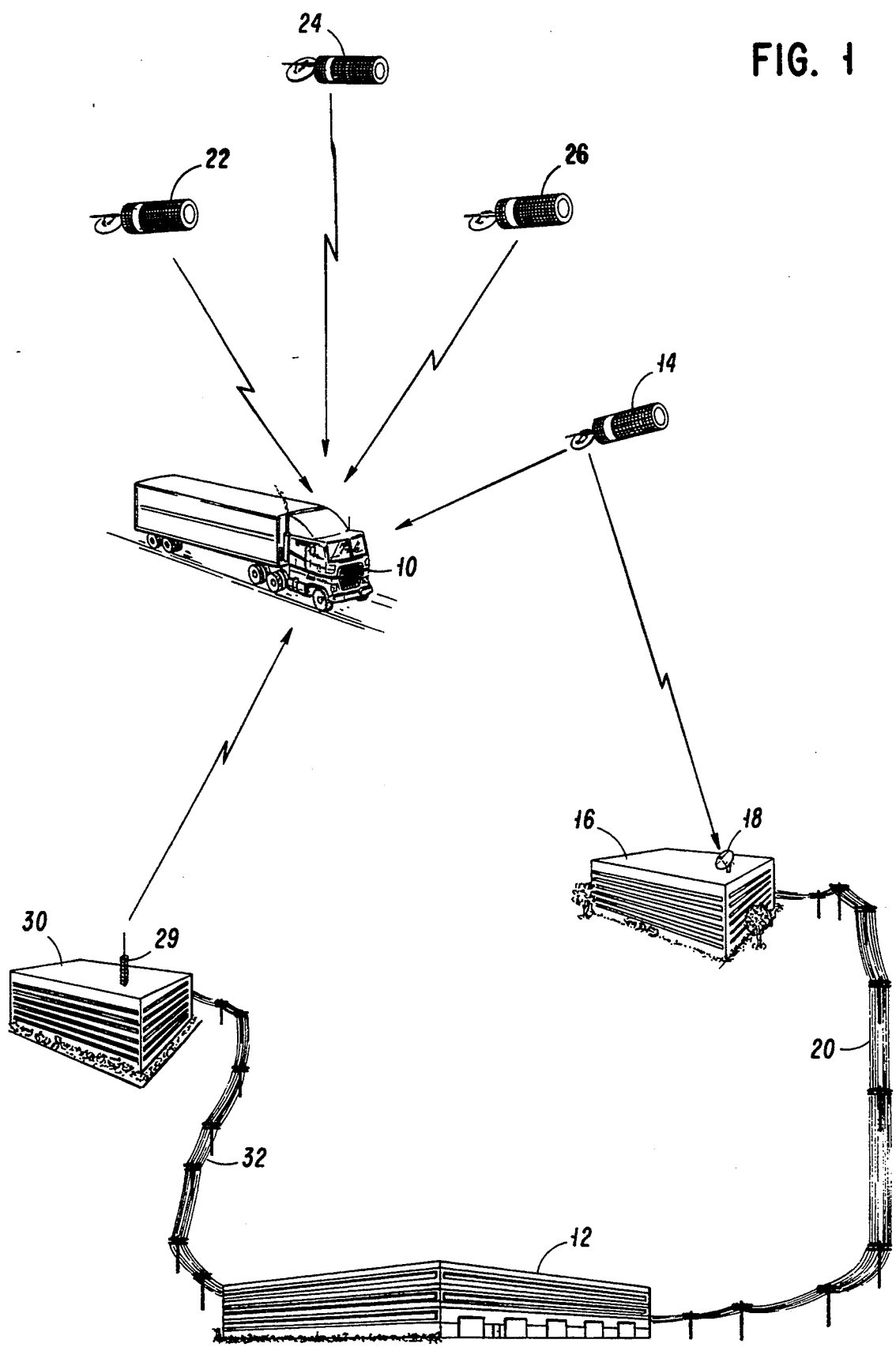
FIG. 1 is a conceptual representation of the communication system of the present invention connecting a remote vehicle with a control center.

Referring to FIG. 1, a remote vehicle 10, such as a long haul truck, is in communication with a dispatcher at a control center 12, such as may typically be located at a dispatch center or home office for a trucking company. Non-voice data communications may be by a land mobile satellite system including a data unit in the cab of remote vehicle 10 (shown in FIG. 2), a communications satellite, a radio transceiver (not shown) in a satellite link station 16 having a dish antenna 18, a telephone landline 20 connected between satellite link station 16 and control center 12, and a computer terminal in control center 12 (see FIG. 3). Messages may be generated by an operator at the computer terminal in control center 12 and transmitted to satellite link station 16 via telephone landline 20. The message may then be converted using a modem and transmitted by the radio transceiver in satellite link station 16 via antenna 18 and communications satellite 14 to the data unit in truck 10. Messages from truck 10 to control center 12 are sent by the same means in reverse order to that just described.

Figure 2:
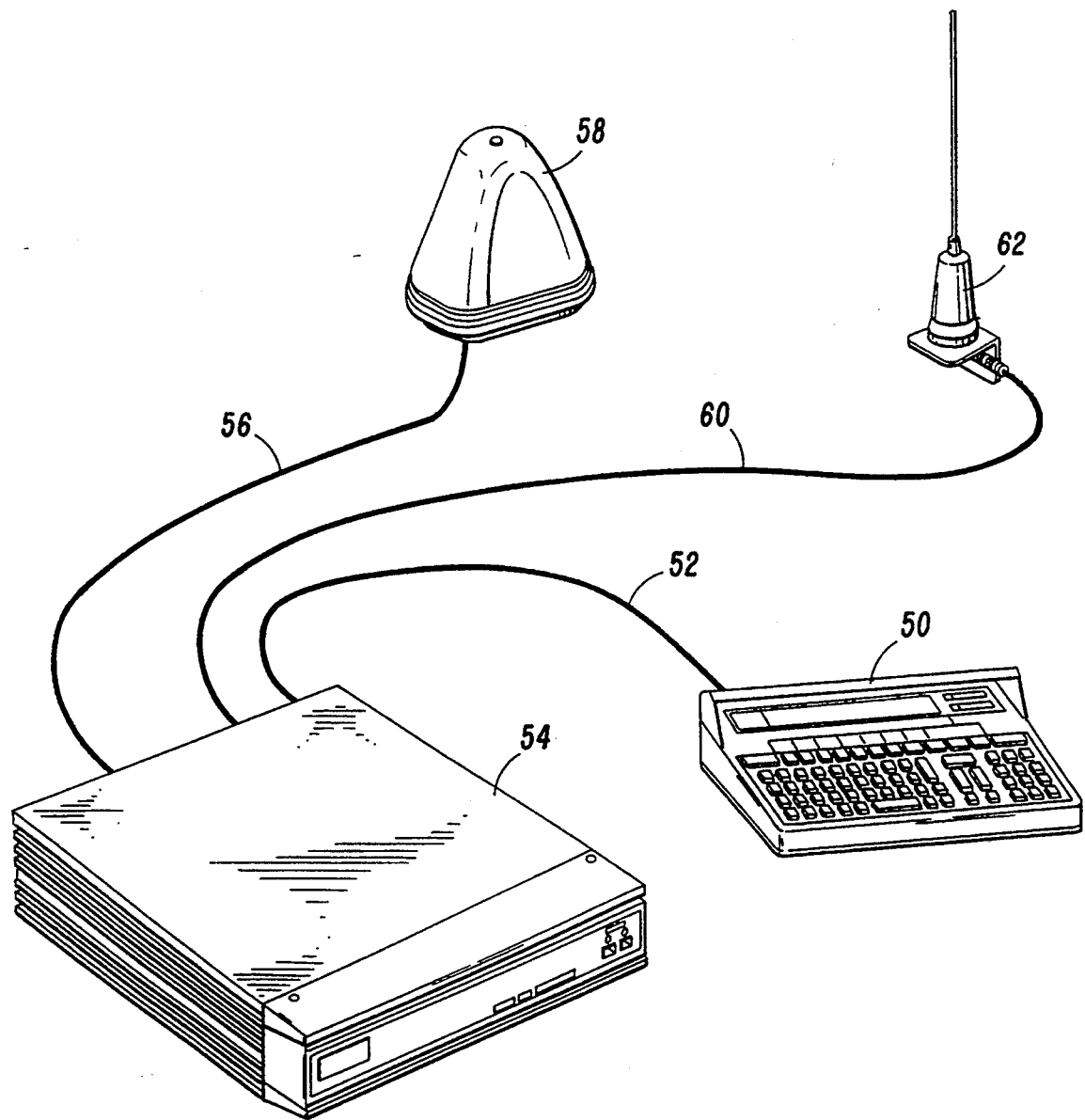
FIG. 2 is a conceptual representation of a non-voice data and position unit for use in the remote vehicle of FIG. 1.

Referring to FIG. 2, the data unit in truck 10 comprises a data terminal 50 connected via a transmission cable 52 to a radio transceiver and control unit 54. Radio transceiver and control unit 54 is coupled via a transmission cable 56 to an external communications antenna unit 58 which is typically mounted atop the cab of remote vehicle 10. Antenna unit 58 typically comprises an antenna with an omnidirectional radiation pattern, a low noise amplifier and a high power amplifier. Antenna unit 58 is covered with a streamlined cover to minimize wind resistance. Control unit 54 is also coupled via a transmission cable 60 to a position antenna 62 for receiving signals from a position transmission system such as provided by LORAN-C or the NAVSTAR: Global Positioning System. In some systems the communications antenna may also serve as the position antenna.

Figure 3:
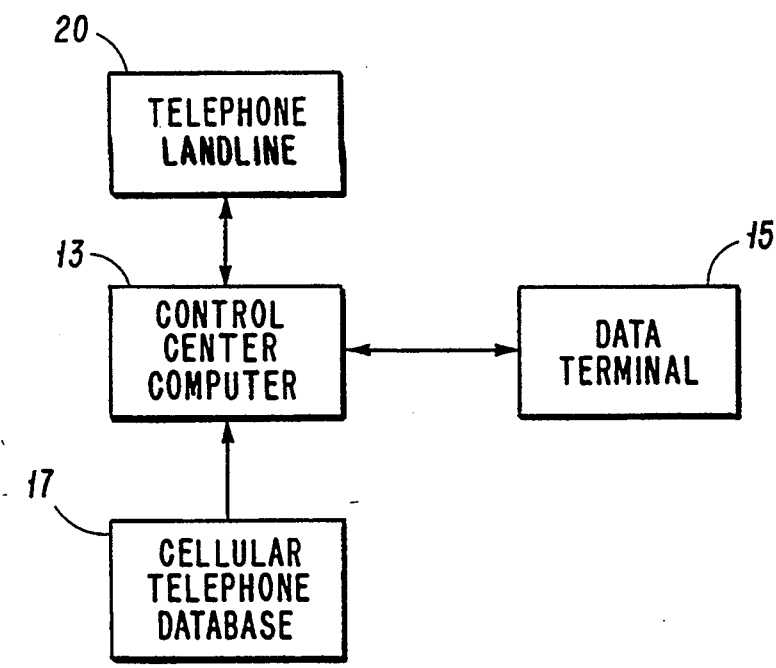
FIG. 3 is a schematic representation of equipment used in the control center of FIG. 1.

Referring now to FIG. 3, the equipment used in control center 12 includes a computer 13 connected for communication with telephone landline 20. Computer 13 has a data terminal to output data received from remote vehicle 10 and input data to be transmitted to remote vehicle 10. Control center computer 13 is provided with a cellular telephone database 17 whose function will be described in connection with FIG. 5.

Referring again to FIG. 1, the location of remote vehicle 10 may be determined by receiving signals from a position transmission system using radio transceiver and control unit 54 described in connection with FIG. 2. The position transmission system may comprise the Navstar Global Positioning System which may, for example, include satellites 22, 24 and 26. The Global Positioning System is capable of providing location information within 50 feet of actual location in all three dimensions anywhere on the earth's surface. Operation of the Global Positioning System will not be described since it is well known in the art and fully described in publications readily available to the public.

As previously noted, other broad coverage position transmission systems such as LORAN-C or the QASPR system offered by Qualcomm Incorporated may also be used as an alternative to the Global Positioning System. In that case the location of remote vehicle 10 is calculated at satellite link station 16 or at control center 12 based upon signal timing measurements.

Figure 4:
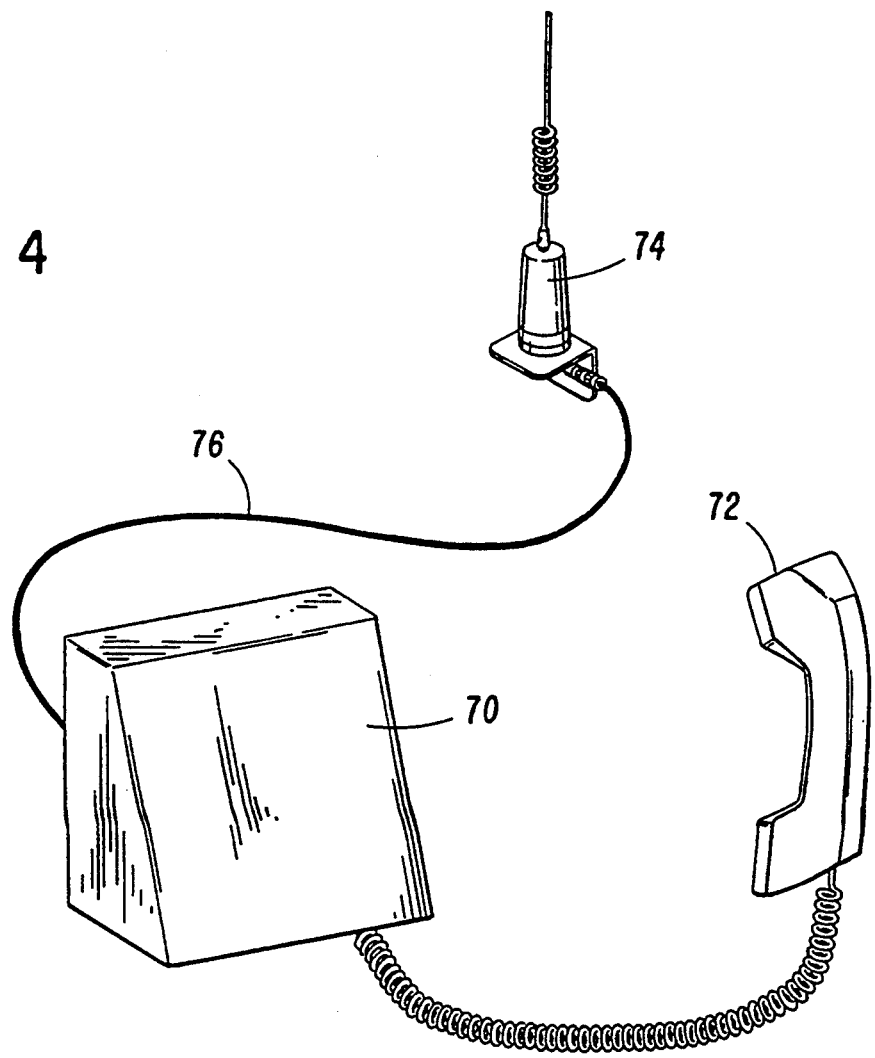
FIG. 4 is a conceptual representation of a typical mobile cellular telephone set.

Voice communications between remote vehicle 10 and control center 12 may be by cellular telephone. As shown in FIG. 4, a typical cellular telephone mobile set comprises a transceiver 70 with a handset 72 mounted in the cab of remote vehicle 10 and an antenna 74 mounted atop the cab of remote vehicle 10 and coupled to transceiver 70 via a transmission cable 76. Referring again to FIG. 1, the remainder of the cellular telephone system comprises an antenna 29 connected to a transceiver, a modem and switching equipment (not shown) in a telephone switching station 30 and a telephone landline 32 connecting switching station 30 to control center 12.

Figure 5:
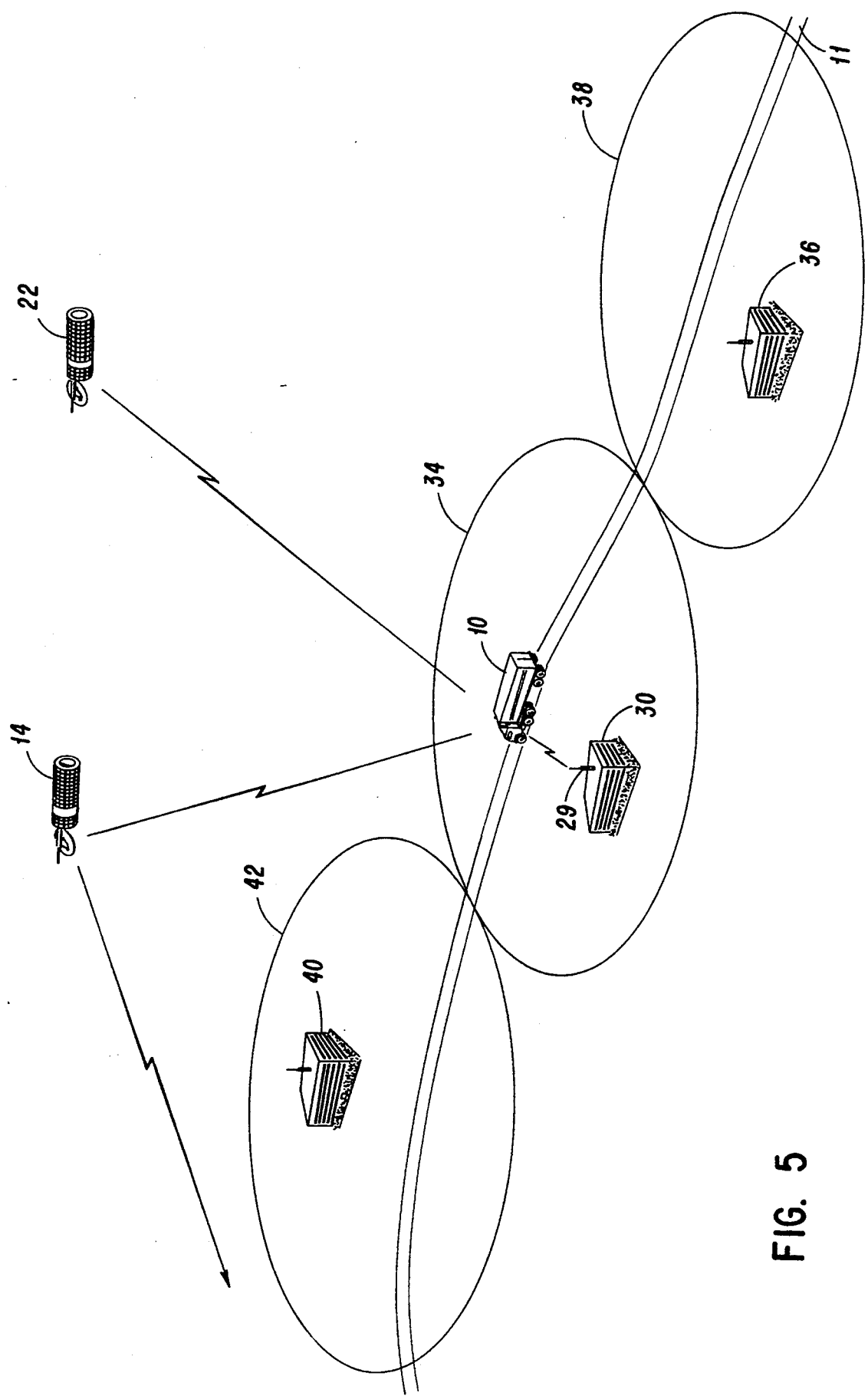
FIG. 5 is a conceptual representation of a remote vehicle passing along a roadway through one of several telephone cells while communicating with communications and positioning satellites.

Referring now to FIG. 5, remote vehicle 10 is shown traveling along a roadway 10 while in communication with a communications satellite 14, a positioning system represented by Global Positioning System satellite 22 (only one satellite is shown in this FIGURE) and a cellular telephone system represented by switching station 30 and its associated antenna 29. Cellular telephone systems typically use UHF radio equipment for communication between switching station 30 and remote mobile cellular telephone sets such as has been described in connection with remote vehicle 30. Since UHF radio signals provide line-of-sight coverage only, the antenna transmission/reception pattern defines a generally circular area 34 known as a "cell". Areas having cellular telephone service require a number of switching stations to provide complete coverage. Cells 34, 38, 42 and other cells may be grouped together to form a single service area. Two other such cellular telephone switching stations 36 and 40 are shown in FIG. 5. Switching station 36 defines and serves a cell 38 which is adjacent cell 34. As indicated by its direction on roadway 11, remote vehicle 10 has already passed through cell 38, and cellular communications which formerly was provided by switching station 36 is now provided by switching station 30. Likewise, cellular telephone switching station 40 defines and serves an area defined by cell 42. When remote vehicle passes along roadway 11 from cell 34 to cell 42, its cellular communications needs will cease to be served by switching station 30 and will be assumed by switching station 40.

Only three cells are shown in FIG. 5, but is should be understood that there may be hundreds or thousands of such cells across the areas that are likely to be travelled by remote vehicle 10. The geography of cellular telephone cells is normally transparent to the user, since cell selection and switching is done automatically. Thus, when telephone calls are initiated from remoted vehicle 10, it is not necessary to know the cell from which it is calling. However, since remote vehicle is normally outside its "home" service area, the roaming surcharge is added to the price of all calls to and from remote vehicle 10. However, in order for a dispatcher at the control center to make successful calls, it is necessary to know the service area in which remote vehicle 10 is located.

Normally it is not possible for someone in the home cell to know the cell in which remote vehicle 10 is located. However, a vehicle equipped with apparatus for receiving positioning signals from sources such as the aforementioned Global Positioning System satellite 14 can automatically determine its geographic position and via a non voice satellite data link transmit the same to control center 12 in the home cell. A computer at control 30 programmed with a data base identifying all telephone cells and their locations can automatically identify the correct cell, and a telephone call can be initiated to remote vehicle 10 from control center 12.

In operation, if the control center 12 desires to initiate a voice contact with remote vehicle 10, it sends a non-voice request for the current location information to radio transceiver and control unit 54 in remote vehicle 10 via computer 13, landline 20, satellite link station 16, satellite 14, and antenna unit 58. In response to the request, radio transceiver and control unit 54 receives position data from satellites 22, 24 and 26 via antenna 62. Radio transceiver and control unit 54 may also alert the crew of remote vehicle 10 that voice communication in imminent. Radio transceiver and control unit 54 then transmit the geographic location of remote vehicle 10 back to control center computer 13 along the same path via satellite 14. Control center computer 13 uses the position information in the return message and cellular telephone information stored in database 17 to determine the cell in which remote vehicle is currently located. A telephone contact is then initiated with cellular telephone set 70 in remote vehicle 10 via landline 32, telephone switching station 30, antenna 29 and antenna 74.

If, on the other hand, the crew of remote vehicle 10 wishes to initiate a voice contact with control center 12, it sends a non-voice request including the explanation and/or urgency of the request via satellite 14 along the same circuit just described. Radio transceiver and control unit 54 determines the geographic location of remote vehicle 10 as just described in the immediately preceding paragraph and then sends the crew request and location to control center 12 as described. Computer 13 in control center 12 then uses the position information to determine the current cell location of remote vehicle 10, and upon dispatcher approval a telephone call to remote vehicle is initiated via the cellular telephone network as described in the preceding paragraph. If the dispatcher declines to accept the call, a data message can be initiated with explanation and/or further instructions such as "Call from next stop on 1-800-XXX-XXXX", where the X's represent the digits of a working telephone number.

It should be understood that the term "cellular telephone system" refers to any telephone system employing electromagnetic waves to communicate between a central switching station and a telephone located in one of a multiplicity of service areas of limited size served by the switching station. Cellular telephone systems could include the current terrestrial cellular systems, satellite-based personal communications systems planned for future use, and any other similar systems.

While particular embodiments of the present invention have been shown and described, it should be clear that changes and modifications may be made to such embodiments without departing from the true scope and spirit of the invention. It is intended that the appended claims to cover all such changes and modifications.

I claim:

1. A system for communicating via a cellular telephone from a control center to a remote vehicle located in an unknown cell served by an unknown cellular carrier, said apparatus utilizing a remote geographic positioning system, and said control center being located outside the coverage area of said unknown cellular carrier, comprising:

a cellular telephone in said remote vehicle;

means in said remote vehicle for receiving information from said remote geographic positioning system;

means in said remote vehicle for transmitting a signal to said control center via a communications satellite which is separate from the facilities of the cellular carrier, said signal including a voice communication request and geographic location information derived from the information received from said positioning system;

means at said control center for determining from the geographic location information the identity of the cell in which said vehicle is located and the identity of the cellular carrier for said cell; and means for communicating from said communications center to said cellular telephone through the facilities of said cellular carrier.

2. The system as described in claim 1 for communicating via a cellular telephone from a communications center to a remote vehicle located in an unknown cell served by an unknown cellular carrier, and said control center being located outside the coverage area of said unknown cellular carrier, wherein said remote geographic positioning system comprises a global positioning satellite.

3. Method of establishing a voice contact between a control center and a remote vehicle equipped with a cellular telephone and located in an unknown cell served by an unknown cellular switching center, said vehicle also being located to communicate via electromagnetic signals with a communications satellite and a global positioning satellite, and said control center being located outside the coverage area of the cellular carrier, comprising the steps of:

receiving, at the remote vehicle positioning signals from said global positioning satellite;

determining at said remote vehicle from said positioning signals, the location of said remote vehicle;

transmitting from the remote vehicle to the control center via said communications satellite a signal incorporating a voice communication request and said location of said remote vehicle;

determining at said control center the identity of the cell in which said vehicle is located and the identity of the cellular carrier for said cell; and initiating a telephone call from said control center to said remote vehicle via landline to the cellular carrier switching center and cellular telephone facilities of said cellular carrier.

4. Method of establishing a voice contact between a control center and a remote vehicle equipped with a cellular telephone and located in an unknown cell served by an unknown cellular switching center, said vehicle also being located to communicate via electromagnetic signals with a communications satellite and a global positioning satellite, and said control center being located outside the coverage area of said unknown cellular carrier, comprising the steps of:

transmitting from said control center to said remote vehicle via said communications satellite a voice communication request;

receiving, at the remote vehicle, positioning signals from said global positioning satellite;

determining at said remote vehicle from said positioning signals the location of said remote vehicle;

transmitting from said remote vehicle to said control center via said communications satellite a signal incorporating said location of said remote vehicle;

determining at said control center the identity of the cell in which said vehicle is located and the identity of the cellular carrier for said cell; and initiating a telephone call from said control center to said remote vehicle via landline to the cellular carrier's switching center and via the cellular telephone facilities of said cellular carrier from the switching center to the remote vehicle.

* * * * *